(12) United States Patent
Daga et al.

(10) Patent No.: US 6,825,265 B2
(45) Date of Patent: Nov. 30, 2004

(54) PIGMENTS AND COMPOSITIONS FOR USE IN LASER MARKING

(75) Inventors: Vijay Daga, Cupertino, CA (US); Klaus J. Dahl, Atherton, CA (US)

(73) Assignee: Tyco Electronics Corporation, Middletown, PA (US)

( * ) Notice: Subject to any disclaimer, the term of this patent is extended or adjusted under 35 U.S.C. 154(b) by 127 days.

(21) Appl. No.: 09/990,107

(22) Filed: Nov. 21, 2001

(65) Prior Publication Data

US 2002/0155291 A1 Oct. 24, 2002

Related U.S. Application Data

(60) Provisional application No. 60/252,286, filed on Nov. 21, 2000.

(51) Int. Cl.$^7$ .............................. C08L 27/12; C08K 3/20
(52) U.S. Cl. ....................... 524/544; 524/430; 524/545; 524/546; 428/405
(58) Field of Search ................................ 524/430, 544, 524/545, 546; 428/405

(56) References Cited

U.S. PATENT DOCUMENTS

| | | | |
|---|---|---|---|
| 4,743,658 A | 5/1988 | Imbalzano et al. ...... 525/326.4 |
| 5,035,748 A | 7/1991 | Burow et al. ................ 106/499 |
| 5,206,280 A | 4/1993 | Williams ..................... 524/409 |
| 5,415,939 A | 5/1995 | Yeung ......................... 248/422 |
| 5,501,827 A | 3/1996 | Deeney et al. .............. 264/460 |
| 5,560,845 A | 10/1996 | Birmingham, Jr. et al. ..................... 219/121.85 |
| 5,607,994 A * | 3/1997 | Tooley et al. ............... 524/285 |
| 5,697,390 A | 12/1997 | Garrison et al. ............ 132/321 |
| 5,789,466 A | 8/1998 | Birmingham, Jr. et al. . 523/213 |
| 5,853,955 A | 12/1998 | Towfiq ................... 430/270.12 |
| 6,214,106 B1 * | 4/2001 | Weber et al. ............... 106/442 |
| 6,455,158 B1 * | 9/2002 | Mei et al. ................... 428/403 |

FOREIGN PATENT DOCUMENTS

| | | | |
|---|---|---|---|
| EP | 0 447 032 A2 | 9/1991 | ............ G11B/7/24 |
| EP | 0 367 629 B1 | 10/1992 | ............ C08L/27/18 |
| EP | 0 675 168 A1 | 10/1995 | ......... C08L/101/00 |
| FR | 2 732 030 | 9/1996 | ......... C09D/127/18 |
| WO | WO 95/23417 | 8/1995 | ............ H01B/7/36 |
| WO | WO 00/74075 | 12/2000 | ............ H01B/3/04 |

OTHER PUBLICATIONS

U. S. patent application Ser. No. 09/587,229, Nyberg et al., filed Jun. 2, 2000.

Search Report for International Application No. PCT/US01/43435 (MP1721–PCT), dated Aug. 22, 2002, mailed Aug. 30, 2002.

* cited by examiner

*Primary Examiner*—Margaret G. Moore
*Assistant Examiner*—Marc S Zimmer

(57) ABSTRACT

Pigments and compositions for use in laser marking. A colorless UV-absorbing pigment at least partially coated with a synergist has the formula $$[R_m(SiO_n)]_p R'_q,$$

wherein (a) m is 1 to 3, n is 1 to 3, p is at least 1, and q is 0 to 3, and (b) at least one R or R' is a substituent that upon pyrolysis generates a black material suitable for providing a mark. Such pigments are useful in fluoropolymers used for wire and cable insulation.

14 Claims, No Drawings

PIGMENTS AND COMPOSITIONS FOR USE IN LASER MARKING

CROSS-REFERENCE TO RELATED APPLICATIONS

This application is an application under 35 USC 111(a) and claims priority under 35 USC 119 from Provisional Application Serial No. 60/252,286, filed Nov. 21, 2000 under 35 USC 111(b). The disclosure of this provisional application is incorporated herein by reference.

BACKGROUND OF THE INVENTION

1. Field of the Invention

This invention relates to pigments and compositions containing such pigments, particularly fluoropolymer compositions, and their use in laser marking of substrates.

2. Introduction to the Invention

Polymers such as fluoropolymers are commonly used as insulating materials for substrates such as wire and cable. For such applications, the fluoropolymer generally surrounds a central wire or provides a jacket around one or more insulated wires. In order to identify particular wires, it is often necessary to mark the insulation or jacketing material with numbers, letters, or other indicia. Laser marking is one preferred method of marking, as it can provide a relatively permanent, highly legible mark on the surface of the insulation and does not produce mechanical damage or require good adhesion of an ink to the polymer.

Laser marking often uses a ultraviolet (UV) laser such as an excimer laser. Because fluoropolymers are transparent to UV radiation, it is generally necessary that a UV light absorbing compound or pigment be added to the fluoropolymer in order to produce marks. A commonly used additive is titanium dioxide ($TiO_2$). When a laser is directed at the additive-containing polymer composition, the photosensitive $TiO_2$ changes color as a result of the laser-induced reduction of $Ti^{4+}$ (colorless) to $Ti^{3+}$ (blue-black) in the $TiO_2$ lattice. The use of $TiO_2$ in a fluoropolymer is disclosed in U.S. Pat. Nos. 5,560,845 and 5,789,466 (both Birmingham et al.), which provide details on laser marking of pigmented melt-processible fluoropolymer substrates that use titanium dioxide pigment coated with organosilane. These documents rely on the organosilane to increase the dispersion of the $TiO_2$ pigment, reducing the number of $TiO_2$ agglomerates and increasing the quality of the mark. In the disclosed compositions, the organosilane is present in an amount from about 0.1 to about 5 weight percent based on the amount of the organosilane and the pigment.

BRIEF SUMMARY OF THE INVENTION

We have now found that laser marks of improved contrast can be produced if the pigment is coated with or in close proximity to a synergist that contains a substituent that upon pyrolysis generates a black material, e.g. carbon, that provides a mark. Such pigments can be used in compositions that are exposed to excimer laser radiation, for example in insulation for wires and cables. Different types of synergists can be used to accommodate the different processing and use conditions of the polymer. In particular, we have found laser marks formed using the pigments of the invention and compositions comprising them retain good contrast under heat aging conditions.

In a first aspect this invention provides a colorless UV-absorbing pigment at least partially coated with a synergist having the formula

wherein (a) m is 1 to 3, n is 1 to 3, p is at least 1, and q is 0 to 3, (b) at least one R or R' is a substituent that upon pyrolysis generates a black material suitable for providing a mark.

In second aspect, the invention provides a composition suitable for laser marking when exposed to radiation from an excimer laser, said composition comprising (1) a fluoropolymer having a processing temperature $T_p$, (2) 0.1 to 25% by weight of the composition of a colorless UV-absorbing pigment, and (3) a synergist according to the first aspect of the invention, said synergist being (i) present at at least 10% by weight of the pigment present in the polymer composition, (ii) heat stable at a temperature of at least $T_p$, and (iii) in physical proximity with the pigment.

Particularly preferred are compositions in which the synergist and pigment are used in polytetrafluoroethylene (PTFE). Therefore, in a third aspect, this invention provides a composition suitable for laser marking when exposed to radiation from an excimer laser, said composition comprising (1) polytetrafluoro ethylene, (2) 0.1 to 50% by weight of the composition of a colorless UV-absorbing pigment, and (3) a synergist having the formula

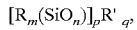

wherein (a) m is 1 to 3, n is 1 to 3, p is at least 1, and q is 0 to 3, and (b) at least one R or R' is a substituent that upon pyrolysis generates a black material suitable for providing a mark, said synergist being (i) present at at least 0.1% by weight of the pigment present in the polymer composition, (ii) heat stable at a temperature of at least $T_p$, and (iii) in physical proximity with the pigment.

Pigments and compositions of the invention are particularly useful for insulating materials. Therefore, in a fourth aspect, this invention provides an insulated conductor which comprises (A) an elongate wire, and (B) an insulating layer surrounding said wire, said layer comprising a composition of the second aspect of the invention.

DETAILED DESCRIPTION OF THE INVENTION

Pigments of the invention absorb UV radiation, i.e. radiation less than about 400 nm. They are preferably substantially colorless. For purposes of this specification, "white" indicates an absence of color and therefore white pigments are colorless. Suitable pigments include titanium dioxide ($TiO_2$), zinc oxide (ZnO), and zinc sulfide (ZnS). Particularly preferred for its opacity, high refractive index, and response to UV radiation is crystalline $TiO_2$. Either rutile or anatase forms of $TiO_2$ can be used. It is preferred that the average particle size of the pigment be less than 1 μm, preferably less than 0.5 μm, particularly less than 0.4 μm, especially less than 0.3 μm.

The pigment is at least partially coated with or in contact with a synergist (also referred to herein as a coating) having the formula $$[R_m(SiO_n)]_p R'_q, \quad (I)$$

in which m is 1 to 3, n is 1 to 3, p is at least 1 and q is 0 to 3. At least one of R and R' substituent that, upon pyrolysis, e.g. resulting from UV radiation, generates a large amount of black material, e.g. carbon black, silicon carbide, silicon oxycarbide, or mixtures thereof. If R is greater than 1, each of the R elements may be the same or different; and if R' is greater than 1, each of the R' elements may be the same or different. R' can be absent depending on the selection of m, n, and p. For example, if m=1, n=1.5, and p is very large, then R' is essentially absent. For cyclic analogs of (I), R' is absent. R and R' may be same or different substituents. For R or R', aryl groups, either substituted or un-substituted, are preferred. The synergist is preferably itself substantially colorless, and should be heat-stable (i.e. does not degrade) and non-volatile to remain relatively unchanged throughout all processing and subsequent product use conditions.

The heat for the pyrolysis results from absorption of excimer laser light by the pigment. Therefore, it is important that the synergist be directly in contact with the pigment or sufficiently close, generally in physical proximity, that heat transfer is easily achieved. The synergist must be coated upon the pigment or be able to migrate to its surface during polymer processing to form a coating that remains closely adjacent to the pigment surface throughout all processing and product use conditions. If coated on the pigment, the synergist may partially cover, e.g. cover at least 25% of the surface area of the pigment, or completely cover the pigment.

Preferred synergists are silsesquioxanes and Polyhedral Oligomeric Silsesquioxanes (POSS). The POSS materials have the generic structure $(RSiO_{1.5})_n$ where R can be any organic residue, but preferably an aromatic group such as phenyl or napthyl, and n can be 8, 10, 12 or larger. In addition, various oligomeric and polymeric silicones of structure $R—(SiO[R^1, R^2]_2)_n—R$ are suitable additives where R, $R^1$, and $R^2$ can be the same or different. Preferably one of the substituents R, $R^1$, or $R^2$ is phenyl, which should be present as a significant substituent, a typical example being a silicone that contains a significant number of phenyl groups (one or two per silicon atom). Suitable phenyl-POSS compounds include octaphenyl-POSS, dodecaphenyl-POSS, and polyphenyl-POSS (available from Hybrid Plastics under the Molecular Silica™ brand, product numbers MS0380, MS0802, and PM1270, respectively). Dodecaphenyl-POSS, which has the structure $[(C_6H_5)SiO_{1.5}]_{12}$, has a cage structure. Heat treatment, e.g. at 200° C. for 1.5 hours, will remove any clathrated solvent used in the manufacture of the dodecaphenyl-POSS; such solvent may have an adverse effect on the stability of any composition into which the synergist is mixed. Although the phenyl-POSS compounds are not known as a laser marking additive or as additives for perfluoropolymers, they have significant advantages in that they are (1) stable at processing temperatures of greater than or equal to 360° C., which is necessary for processing of some polymers, including perfluoropolymers, and (2) colorless in visible light.

Also suitable for use are phenylalkoxy silanes, e.g. phenyltrimethoxy silane such as that available from Sivento Inc. under the name CP0330. Both the phenyl POSS materials and phenyl silanes are stable at high temperature.

The synergist is generally present in an amount of more than 5% by weight of the total amount of synergist and pigment, preferably at least 10% by weight, particularly at least 20% by weight, especially at least 30% by weight, and can be present at much higher percentages, e.g. 50% or more. These quantities are particularly appropriate for melt-processible polymers (as described below) containing a phenyl silane or silicone. However, for melt-processible polymers comprising silsesquioxanes or POSS synergists, or for non-melt-processible polymers comprising any of the designated synergists, the amount of synergist present may be much lower, e.g. at least 0.1% by weight of the total amount of synergist and pigment, preferably at least 0.5% by weight, especially at least 1% by weight.

The pigments described above may be used to enhance laser marking in compositions comprising any suitable polymer, including polyolefins such as polyethylene and polypropylene. However, of particular interest, especially for airframe wire, are fluoropolymers. These include melt-processible fluoropolymers such as ethylene/tetrafluoroethylene copolymer (ETFE) and melt-processible perfluoropolymers in which each hydrogen directly attached to a carbon atom is replaced by fluorine. Suitable melt-processible perfluoropolymers include tetrafluoroethylene/hexafluoropropylene copolymer (FEP), tetrafluoroethylene/propyl vinyl ether copolymer (PFA), and tetrafluoroethylene/methyl vinyl ether copolymer (MFA). Such polymers may be melt-processed using any suitable equipment, e.g. extrusion. Polytetrafluoroethylene (PTFE), which is not melt-processible, may also be used. Compositions comprising PTFE may be processed by ram extrusion, followed by sintering. Processing of either melt-processible or non-melt-processible polymers can be carried out by alternative techniques, e.g. by electrostatic coating or dispersion coating in which the composition is deposited onto a substrate and then heat-treated. The polymer of the composition has a processing temperature $T_p$ which is defined as the highest temperature the composition is exposed to during normal processing of the composition. For crystalline polymers, $T_p$ is generally greater than the melting temperature $T_m$ which is defined as the peak of the exotherm on a differential scanning calorimeter (DSC) trace.

Perfluoropolymers of high purity are particularly preferred for use, as they provide maximum contrast at a given concentration of pigment and coating. High purity PFAs are fully end-capped with fluorine, having fewer than six non-fluorinated end groups per million carbon atoms. Such polymers are disclosed in U.S. Pat. No. 4,743,658 (Imbalzano et al.), the disclosure of which is incorporated herein by reference.

The compositions of the invention comprise a substantially colorless UV-absorbing pigment, e.g. $TiO_2$, in an amount of 0.1 to 70% by weight of the total composition, preferably 0.1 to 50%, particularly 0.1 to 25%, especially 0.1 to 10%. Also present is a synergist as described above. The synergist is selected to be heat stable at a temperature of at least $T_p$. It may be in direct physical contact with the pigment, e.g. crosslinked to the pigment prior to adding to the polymer. Alternatively, it can migrate close enough to the pigment during processing to have sufficient physical proximity for heat transfer during UV radiation.

We have found that the order of addition of the synergist and pigment to the molten polymer may have an effect on the final contrast. In general, if the synergist is added after the pigment, it preferentially coats the high surface energy pigment particles. However, if the synergist is added after the pigment, it may be dispersed in the polymer homogeneously and not be available to coat the pigment as well, resulting in a lower contrast. In addition, the temperature of mixing can affect the contrast of the final composition, with lower processing temperatures often giving better contrast. In particular, very high processing temperatures of perfluoropolymers may generate hydrofluoric acid (HF), which can adversely affect the synergist structure. If the synergist melts, processing at a temperature above that melting range may allow better contact to the pigment. For example, DPOSS shows melting regions at temperatures up to about 375° C., so that processing above this temperature allows the synergist to melt and coat the pigment.

Particularly preferred for use with PTFE is polyphenyl silsesquioxane (PPSQ; available from Gelest under the name SST-3P01). PPSQ has a ladder structure. We have found that this material may be crosslinked, so that when it is coated onto a pigment, it forms a coating that stays on the pigment and is resistant to certain types of solvent used in the manufacture of PTFE tapes. One suitable crosslinking procedure is described in Example 15, below.

Compositions of the invention are particularly suitable for use on an insulated conductor in which an elongate element, e.g. a wire, cable, or bundle of wires, is surrounded at least in part by an insulating layer comprising the composition. Compositions can also be used to surround an elongate element which is a fiber optic cable. If the composition is based on a melt-processible polymer, the composition may be extruded over the element. Alternatively, if the composition comprises a non-melt-processible polymer, e.g. PTFE, it may be ram extruded or tape-wrapped over the element. One or more layers of different or the same thickness and/or composition may be present between the wire or cable and the layer of composition. Such layers may include a mica tape such as is disclosed in U.S. application No. 09/587,229 (Nyberg et al.) and International Publication No. WO 00/74075 (Tyco Electronics Corporation et al.), the disclosure of which is incorporated herein by reference. In general, the contrast is greater as the wall thickness of the insulating layer containing the pigment and synergist increases.

The conductor may comprise an outer layer of polymer which does not contain the pigment or synergist. Such a layer must be sufficiently thin, e.g. less than 0.1 mm, to allow the laser radiation to penetrate through it to mark the underlying pigmented layer. This outer layer may improve the abrasion resistance of the conductor, while still providing a conductor with acceptable contrast.

Contrast, expressed as a percent, is the difference between the reflectance of the mark and the background on which the mark is placed. Contrast produced using the pigments and compositions of the invention is at least 70%, preferably at least 75%, particularly at least 80%, and remains at a high level even after heat-aging at an elevated temperature for 24 hours or more.

As a general rule, for infusible polymers (e. g. PTFE), precursors to thermosets, or polar thermoplastics (e. g. polyethylene terephthalate, polybutylene terephthalate, polyvinylidene fluoride, or polyvinyl chloride), the synergist is preferably $[C_6H_5SiO_{1.5}]_n$ coated onto the pigment and crosslinked thereupon. For less polar thermoplastic polymers (e.g. PFA, FEP, polypropylene or polyethylene), the synergist can be $[C_6H_5SiO_{1.5}]_n$, or a low molecular weight variant that can migrate to the pigment dispersed in the polymer matrix during thermoplastic processing to form a coating on such pigment, which remains in this location during product use. A preferred compound is dodecaphenylsilsesquioxane, $[C_6H_5SiO_{1.5}]_{12}$.

The compositions of the present invention are particularly useful for airframe wire insulation. For example, one commercial PTFE tape for aircraft wire comprises about 4% $TiO_2$. When this tape is illuminated with an excimer laser at 308 nm it provides about 60 to 70% laser mark contrast. Examples of PTFE compositions of the invention exhibit contrast of more than 75%.

While the invention generally has been disclosed in terms of silicon-based synergists, a more general description is that synergist has the formula

$$[R_sX]_t \qquad (II)$$

where R is as previously defined (i.e. a substituent that is chosen to afford upon pyrolysis a large amount of black bodies), X is a structural unit comprising one or more elements, s is given by the remaining valences of X, and t is at least 1. Examples of synergist II are aryl-substituted siloxanes, silanes, silsesquioxanes, phosphine oxides, phosphonates, phosphazenes, and their oligomers or polymers.

The present invention also includes a method of providing a mark onto a polymer substrate, the method comprising (1) providing a composition of the invention, and (2) exposing the composition to an excimer laser to pyrolyze a substituent of the synergist and produce black material for a mark.

The invention is illustrated by the following examples, in which Examples 20, 23, 31, 32, and 33 are comparative examples.

Melt-Processible Compositions

EXAMPLES 1 to 30

The formulations set forth in Table I were prepared and granulated or pelletized using the ingredients described in Tables II (in which "MFR" means melt flow rate as identified by the manufacturer), III, and IV, and following the procedures set forth below. Table I lists the total % coating as a percentage of the amount of pigment, as determined by [weight % coating/(weight% coating+weight % pigment)], as well as the total amount of pigment present in the composition by weight of the total composition.

EXAMPLE 1

The polymer was introduced into a 250 cc Brabender mixing bowl heated to about 350° C. and melted. The DPOSS was added to the polymer and mixed, then the $TiO_2$ pigment was added and mixed. The composition was removed from the mixing bowl, cooled, and granulated. The granulated composition was then extruded at a temperature of about 375–385° C., using a 25.4 mm extruder having a length/diameter ratio of 24:1, over a 20 AWG nickel-coated copper 19 strand wire to give a wall thickness of about 0.20 mm (0.008 inch). Samples of each extruded wire were then laser marked. All laser marking was conducted by Spectrum Technologies PLC (UK), using a Capris 100 XeCl excimer laser at 308 nm wavelength with 800 mJ/cm² fluence. The contrast measurements were also conducted by Spectrum, using a Capris CMS2system. The contrast, expressed as a percent, is the difference between the reflectance of the mark and the background on which the mark is placed.

EXAMPLE 2

The procedure of Example 1 was followed, except that after the polymer was melted, the $TiO_2$ was then added, followed by the DPOSS. Comparison of the contrast data of Examples 1 and 2 showed that the addition of the coating material after the pigment produced higher contrast.

EXAMPLE 3

Dodecaphenyl POSS was heated at 385° C. for one hour to render it infusible and more soluble in toluene. This material was then dissolved in toluene. Two parts of Kronos 2078 TiO2 to 1 parts of DPOSS were mixed in the DPOSS/toluene solution and stirred; the toluene was removed by heating above its boiling point. The resulting coated $TiO_2$ was ground to 200 mesh screen size, added to melted polymer, and mixed, cooled, and granulated. The composition was then extruded as in Example 1.

EXAMPLE 4

Following the procedure of Example 3, DPOSS-coated $TiO_2$ was prepared in a ratio of 4 parts $TiO_2$ to 1 part DPOSS. The procedure of Example 1 was then followed.

EXAMPLE 5

Following the procedure of Example 3, DPOSS-coated $TiO_2$ was prepared in a ratio of 8 parts $TiO_2$ to 1 part DPOSS. The procedure of Example 1 was then followed.

EXAMPLE 6

Following the procedure of Example 3, DPOSS-coated $TiO_2$ was prepared in a ratio of 16 parts $TiO_2$ to 1 part DPOSS. The procedure of Example 1 was then followed.

EXAMPLES 7 to 12

Following the procedure of Example 2, the $TiO_2$ was added to the melted polymer, followed by the DPOSS. The procedure of Example 1 was then followed except that the extrusion was conducted at about 400° C.

EXAMPLE 13

100 parts Kronos 2078 $TiO_2$ and 25 parts of phenyltrimethoxy silane (CP0330) were used. The phenyltrimethoxy silane was prehydrolyzed by adding 3 moles of water to each mole of silane. HCl was then added reach a pH of 2. Ethanol was added while vigorously stirring the mixture until a single phase resulted. The mixture was covered and stirred for 3 hours. A slurry of the $TiO_2$ in water was prepared and the prehydrolyzed silane was added and mixed well. The mixture was heated at 100° C. in a forced air oven until it was dry, then the dried, treated $TiO_2$ was broken into small pieces, was jet milled to about 8.5 $\mu$m average particle size, and then ground cryogenically. 1.75% by weight of the ground pigment was added to the melted polymer, and mixed (at about 370° C.), granulated, and extruded (at about 400° C.) as in Example 1.

EXAMPLE 14

The procedure of Example 13 was followed to prepare the phenyltrimethoxy silane-coated $TiO_2$, except that the dried treated pigment was ground to pass through a 200 mesh sieve. The ground pigment was mixed at 360° C., and then granulated and extruded (at 385° C.) as in Example 1.

EXAMPLE 15

Kronos 2078 was coated with Gelest SST-3P01 polyphenylsilsequioxane (PPSQ) in a ratio of 4:1 $TiO_2$:PPSQ by the following method. A 5-liter, 3-neck round bottom flask was equipped with a mechanical stirrer, a dropping funnel, two thermometers, a distillation unit via a trap, and an electric heating mantle mounted on jack. The reaction system was continuously purged with nitrogen. The reactor was charged with 1200 ml of deionized water and, with the stirrer turned on, 300 g of $TiO_2$ was added at room temperature. The suspension was stirred at room temperature for 2 hours. Separately, 75 g of PPSQ were dissolved in about 175 ml of toluene. This solution was added via a dropping funnel to the well-stirred suspension of the $TiO_2$ within 20 minutes; residual PPSQ in the dropping funnel was rinsed over with about 20 ml of toluene. The resultant suspension-emulsion was stirred at room temperature for about 2 hours, then the temperature was increased to about 90° C. to distill the toluene/water (80/20, wt/wt) azeotrope (nominal boiling point: 85° C.). In order to minimize foam from forming there was a relatively large unused reactor volume and the addition of about 5 ml of deionized water near the end of the azeotropic distillation (which suppressed foaming to some extent). In addition the trap prevented the foam from entering the distillation unit. Increasing the nitrogen flow at the end of the distillation and keeping the pot temperature at or below 90° C. facilitated the removal of residual toluene. Then, 1.75 g of concentrated ammonia, dissolved in about 30 ml of deionized water, was added to catalyze the crosslinking of the PPSQ coating on the titanium dioxide particles and to minimize agglomeration during the subsequent product drying. The heating was turned off, while maintaining stirring until the reaction slurry had cooled to room temperature. The slurry was centrifuged at 10,000 rpm for 0.5 hour and the turbid supernatant fluid was decanted from the centrifuge cake, which was then dried for>1 hour at 100° C. to afford a soft powder. This powder was further dried at 150° C. and 200° C. (to complete the crosslinking) for one hour each under a nitrogen purge to afford 357 g of product. Scanning electron microscopy showed a uniformly coated powder. The powder was then jet milled to a finer particle size, was added to the melted polymer, and was mixed, granulated, and extruded (at 385° C.) as in Example 1.

EXAMPLE 16

8.7 gms of Kronos 2078 and 8.7 gms of polyphenyl POSS (Hybrid Plastics PM 1270) were dissolved in 500 ml of toluene. The toluene was removed by heating and the resultant material was dried in a vacuum oven at 200° C. for one hour. The dried material was ground by mortar and pestle to give a relatively coarse powder having a ratio of 1:1 $TiO_2$:PPOSS. The PPOSS-coated $TiO_2$ was added to the melted polymer, mixed (at 365° C.), granulated, and extruded (at 375° C.) as in Example 1.

EXAMPLE 17

Following the procedure of Example 13, 100 parts Kronos 2078 TiO2 and 10 parts of phenyltrimethoxy silane (CP0330.) were used to prepare a treated $TiO_2$ which was ground to pass through a 200 mesh sieve. 1.1% by weight of the ground pigment was then added to the melted polymer, and mixed (at about 350° C.), granulated, and extruded as in Example 1.

EXAMPLE 18

Following the procedure of Example 13, 100 parts Kronos 2078 TiO2 and 20 parts of phenyltrimethoxy silane (CP0330.) were used to prepare a treated $TiO_2$ which was ground to pass through a 200 mesh sieve. 1.2% by weight of the ground pigment was then added to the melted polymer, and mixed (at about 350° C.), granulated, and extruded as in Example 1.

EXAMPLE 19

Following the procedure of Example 2, the $TiO_2$ was added to the melted polymer, followed by the DPOSS. The procedure of Example 1 was then followed except that the extrusion was conducted at about 400° C.

EXAMPLE 20 (COMPARATIVE)

25% by weight Kronos 2078 TiO2 and 75% by weight Dyneon PFA 8502 UHP were fed together into a 27 mm corotating Leistritz twin screw extruder heated to about 380° C. and compounded/pelletized to form a masterbatch (Masterbatch 1). 4% by weight of the masterbatch and 96% by weight of Dyneon PFA8502 UHP were dry-blended and extruded at 400° C. as in Example 1.

EXAMPLE 21

93.02% by weight of Masterbatch 1 of Example 20 was fed into the Leistritz extruder along with 6.98% by weight DPOSS and compounded/palletized to form Masterbatch 2. 4.3% by weight of Masterbatch 2 and 95.7% by weight of Dyneon PFA 8502 UHP were dry-blended and extruded at 400° C. as in Example 1.

EXAMPLE 22

The same procedure was followed as for Example 21, except that the dry-blended material was extruded at 400° C. over a 24 AWG nickel-coated copper 19 strand wire to give a wall thickness of about 0.20 mm (0.008 inch).

EXAMPLE 23 (COMPARATIVE)

$TiO_2$ was added to the melted polymer and the mixture was mixed (at 370° C.), granulated, and extruded as in Example 1.

EXAMPLES 24 TO 27

Prior to compounding, the DPOSS was heat-treated at 200° C. for 1.5 hours to remove solvent. Following the procedure of Example 2, the $TiO_2$ was added to the melted polymer, followed by the heat-treated DPOSS. The mixture was then mixed, cooled, granulated, and extruded as in Example 1.

EXAMPLE 28

Following the procedure of Example 2, TiO2 was added to the melted polymer, followed by DPOSS, and then 0.75% of Wilson FEP blue color concentrate. The mixture was mixed, granulated, and extruded as in Example 1.

EXAMPLES 29 AND 30

Following the procedure of Example 2, TiO2 was added to the melted polymer, followed by DPOSS, and the mixture was mixed, granulated, and extruded as in Example 1. The use of normal purity FEP, rather than high purity FEP, resulted in lower contrast.

TABLE I

| | Polymer | | Coating | | Pigment | | | | Contrast |
|---|---|---|---|---|---|---|---|---|---|
| Example | Type | % | Type | % | Type | % | % Coating | % Pigment | % |
| 1 | PFA1 | 98.0 | DPOSS1 | 1 | $TiO_2$1 | 1 | 50 | 1 | 81.4 |
| 2 | PFA1 | 98.0 | DPOSS1 | 1 | $TiO_2$1 | 1 | 50 | 1 | 87.7 |
| 3 | PFA1 | 98.5 | DPOSS1 | 0.5 | $TiO_2$2 | 1 | 33 | 1 | 89.5 |
| 4 | PFA1 | 98.8 | DPOSS1 | 0.24 | $TiO_2$3 | 0.96 | 20 | 0.96 | 87.2 |
| 5 | PFA1 | 98.87 | DPOSS1 | 0.13 | $TiO_2$4 | 1 | 11 | 1 | 82.3 |
| 6 | PFA1 | 98.94 | DPOSS1 | 0.06 | $TiO_2$5 | 1 | 5.9 | 1 | 81.5 |
| 7 | PFA2 | 98.3 | DPOSS1 | 0.2 | $TiO_2$1 | 1.5 | 11.8 | 1.5 | 83 |
| 8 | PFA2 | 98.2 | DPOSS1 | 0.3 | $TiO_2$1 | 1.5 | 16.7 | 1.5 | 85 |
| 9 | PFA2 | 98.1 | DPOSS1 | 0.4 | $TiO_2$1 | 1.5 | 21 | 1.5 | 86 |
| 10 | PFA2 | 97.7 | DPOSS1 | 0.3 | $TiO_2$1 | 2.0 | 13 | 2 | 82 |
| 11 | PFA2 | 98.2 | DPOSS1 | 0.3 | $TiO_2$6 | 1.5 | 16.7 | 1.5 | 84 |
| 12 | PFA2 | 98.2 | DPOSS1 | 0.3 | $TiO_2$7 | 1.5 | 16.7 | 1.5 | 75 |
| 13 | PFA3 | 98.25 | PhS | 0.35 | $TiO_2$8 | 1.4 | 20 | 1.4 | 76 |
| 14 | PFA4 | 98.8 | PhS | 0.24 | $TiO_2$8 | 0.96 | 20 | 0.96 | 71 |
| 15 | PFA2 | 98.33 | PPSQ | 0.33 | $TiO_2$9 | 1.34 | 20 | 1.34 | 77 |
| 16 | PFA1 | 98.0 | PPOSS | 1 | $TiO_2$10 | 1 | 50 | 1 | 79 |
| 17 | PFA1 | 98.9 | PhS | 0.1 | $TiO_2$11 | 1 | 9.1 | 1 | 78 |
| 18 | PFA1 | 98.8 | PhS | 0.2 | $TiO_2$12 | 1 | 16.7 | 1 | 80 |
| 19 | PFA5 | 98.3 | DPOSS1 | 0.5 | $TiO_2$1 | 1.2 | 29.4 | 1.2 | 88 |
| 20 | PFA3 | 99.0 | — | 0 | $TiO_2$1 | 1 | 0 | 1 | 53 |
| 21 | PFA3 | 98.7 | DPOSS1 | 0.3 | $TiO_2$1 | 1 | 23 | 1 | 76 |
| 22 | PFA3 | 98.7 | DPOSS1 | 0.3 | $TiO_2$1 | 1 | 23 | 1 | 74 |
| 23 | FEP1 | 99.0 | — | 0 | $TiO_2$1 | 1 | 0 | 1 | 56 |
| 24 | FEP2 | 98.0 | DPOSS2 | 1 | $TiO_2$1 | 1 | 50 | 1 | 89 |
| 25 | FEP3 | 98.0 | DPOSS2 | 1 | $TiO_2$1 | 1 | 50 | 1 | 81 |
| 26 | FEP1 | 98.0 | DPOSS2 | 1 | $TiO_2$1 | 1 | 50 | 1 | 82 |
| 27 | FEP1 | 98.4 | DPOSS2 | 0.6 | $TiO_2$1 | 1 | 37.5 | 1 | 77 |
| 28 | FEP1 | 97.25 | DPOSS2 | 1 | $TiO_2$1 | 1 | 50 | 1 | 80 |
| 29 | FEP4 | 98.4 | DPOSS2 | 0.6 | $TiO_2$1 | 1 | 37.5 | 1 | 63 |
| 30 | FEP4 | 97.4 | DPOSS2 | 0.6 | $TiO_2$1 | 2 | 23.1 | 2 | 62 |

TABLE II

| Component | Designation | Manufacturer | Comments |
|---|---|---|---|
| Perfluoroalkoxy resins | | | |
| PFA1 | PFA 440 HPB | DuPont | High purity, fluorine end-capped; MFR 14 |
| PFA2 | PFA 445 HP | DuPont | High purity, fluorine end-capped; MFR 5 |
| PFA3 | 8502 UHP | Dyneon | High purity, fluorine end-capped; MFR 2 |
| PFA4 | PFA 340 | DuPont | Normal purity; MFR 14 |
| PFA5 | PFA 950 HP | DuPont | High purity, fluorine end-capped; PEVE comonomer; MFR 1.7–3.0 |
| Fluorinated ethylene/propylene copolymers | | | |
| FEP1 | FEP 5100J | DuPont | High purity, end capped; MFR 22 |
| FEP2 | FEP 100J | DuPont | High purity, end capped; MFR 6.6 |
| FEP3 | FEP 100 | DuPont | Normal purity; MFR 6.6 |
| FEP4 | FEP 5100 | DuPont | Normal purity; MFR 22 |

TABLE III

| Component | Designation | Manufacturer | Comments |
|---|---|---|---|
| DPOSS1 | MS0802 | Hybrid Plastics | Dodecaphenyl polyhedral oligomeric silsesquioxane; cage structure; initial particle size~120 μm; $(C_6H_5SiO_{1.5})_{12}$ |
| DPOSS2 | | | DPOSS1 heat-treated at 200° C. for 1.5 hours to remove solvent. |
| PhS | CP0330 | Sivento Inc. | Phenyltrimethoxy silane |
| PPSQ | SST-3P01 | Gelest | Polyphenyl silsesquioxane; ladder structure |
| PPOSS | PM1270 | Hybrid Plastics | Polyphenyl polyhedral oligomeric silsesquioxane; cage structure in a polymer chain; initial particle size~40 μm |

TABLE IV

| Component | Designation | Manufacturer | Comments |
|---|---|---|---|
| $TiO_2$ | | | |
| $TiO_2$1 | 2078 | Kronos | Rutile; no coating; particle size~0.27 μm |
| $TiO_2$2 | 2:1 | | 2:1 Kronos 2078:DPOSS1 |
| $TiO_2$3 | 4:1 | | 4:1 Kronos 2078:DPOSS1 |
| $TiO_2$4 | 8:1 | | 8:1 Kronos 2078:DPOSS1 |
| $TiO_2$5 | 16:1 | | 16:1 Kronos 2078:DPOSS1 |
| $TiO_2$6 | AHR-F | Huntsman | Anatase; some organic coating; crystal size~0.13 μm |
| $TiO_2$7 | TiPure R103 | DuPont | Rutile; 0.25% organic treatment; 3.2% alumina; particle size~0.23 μm |
| $TiO_2$8 | 4:1 | | 4:1 Kronos 2078:PhS (CP0330) |
| $TiO_2$9 | 4:1 | | 4:1 Kronos 2078:XLPPSQ |
| $TiO_2$10 | 1:1 | | 1:1 Kronos 2078:phenyl-trimethoxy silane |
| $TiO_2$11 | 10:1 | | 10:1 Kronos 2078:PhS (CP0330) |
| $TiO_2$12 | 5:1 | | 5:1 Kronos 2078:PhS (CP0330) |
| $TiO_2$13 | TiPure R100 | DuPont | Rutile; 0.2% organic treatment; 1.7% alumina; particle size~0.32 μm |
| $TiO_2$14 | Tiona RCL-4 | Millennium Inorganic Chemicals | Rutile; 97% $TiO_2$ minimum; alumina and organic coating; particle size~0.27 μm |
| $TiO_2$15 | 2:1 | | 2:1 Kronos 2078:XLPPSQ |

PTFE Tape Wrapped Samples (Examples 31 to 38)

Unsintered PTFE tapes were prepared by the following process: the designated $TiO_2$ pigment as shown in Table V was jet-milled to reduce the particle size, and was then added to the PTFE (613A, available from DuPont) in a low shear mixing process, followed by a high shear mixing process to enhance the dispersion of the pigment. A lubricant was added to the PTFE/pigment mixture under low shear mixing conditions. Preforms of the lubricated PTFE/pigment mixture were prepared, followed by aging, ram extrusion into tape form, and calendaring to a desired thickness. Lubricant was then removed by heat-treatment below 250° C., and the tape was slit to the desired width.

One or more unsintered PTFE tapes were wrapped over nickel-copper wire wrapped with mica tape using an EJR tape wrapper. The mica tape was prepared as described in Example 4 of U.S. application No. 09/587,229 (Nyberg et al.) and International Publication No. WO 00/74075 (Tyco Electronics Corporation et al.), the disclosure of which is incorporated herein by reference. The PTFE insulation was sintered at a temperature of 380 to 400° C. for a period of about 1 minute. The outer diameter of the completed conductor, as the contrast measured as described in Example 1, are shown in Table V. The coating and pigment numbers in Table V refer only to the outermost layer of the or if more than one polymer layer is present.

TABLE V

| | Coating | | Pigment | | Wire | Outer Diameter | Contrast |
|---|---|---|---|---|---|---|---|
| Example | Type | % | Type | % | (AWG) | (mm) | % |
| 31 | — | 0 | $TiO_2$13 | 4 | 20 | 1.42 | 69.6 |
| 32 | — | 0 | $TiO_2$14 | 4 | 20 | 1.45 | 60.2 |
| 33 | — | 0 | $TiO_2$14 | 4 | 24 | 1.22 | 66.0 |
| 34 | PPSQ | 0.33 | $TiO_2$15 | 1.34 | 24 | 1.24 | 86.0 |
| 35 | PPSQ | 0.33 | $TiO_2$15 | 1.34 | 24 | 1.23 | 86.0 |
| 36 | PPSQ | 0.24 | $TiO_2$9 | 0.96 | 24 | 1.23 | 76.0 |
| 37 | PPSQ | 0.33 | $TiO_2$15 | 1.34 | 20 | 1.33 | 77 |
| 38 | PPSQ | 0.33 | $TiO_2$15 | 1.34 | 20 | 1.47 | 81 |

EXAMPLE 31 (COMPARATIVE)

Mica tape was wrapped on the wire with 50% overlap. Two layers of 0.051 mm (0.002 inch) thick commercial PTFE tape (DuPont 613 A) containing 4% TiPure R100 $TiO_2$ were overlapped 52%.

EXAMPLE 32 (COMPARATIVE)

Mica tape was wrapped on the wire with 50% overlap. Three layers of 0.038 mm (0.0015 inch) thick commercial PTFE tape (DuPont 613 A) containing 4% RCL-4 $TiO_2$ were overlapped 52%.

EXAMPLE 33 (COMPARATIVE)

Mica tape was wrapped on the wire with 50% overlap. Two layers of 0.076 mm (0.003 inch) thick commercial PTFE tape (DuPont 613A) containing 4% of RCL-4 TiO$_2$ were overlapped 52%.

EXAMPLE 34

Using the procedure described in Example 15, Kronos 2078 was coated with Gelest SST-3P01 polyphenylsilsequioxane (PPSQ) in a ratio of 2:1 TiO$_2$:XLPPSQ. This coated pigment was used to prepare an unsintered 0.076 mm (0.003 inch) thick PTFE tape containing 2% by weight of the coated pigment, by the process described above. A conductor was prepared by wrapping mica tape on the wire with 50% overlap. A first layer of the unsintered PTFE tape was overlapped 52%, and a second identical unsintered PTFE tape was placed over the first PTFE layer and overlapped 52%.

EXAMPLE 35

Mica tape was wrapped on the wire with 50% overlap. A first layer of 0.076 mm (0.003 inch) thick commercial PTFE tape (DuPont 613A) containing 4% of RCL-4 TiO2 was overlapped 52%, and covered with a layer of the 0.076 mm (0.003 inch) PTFE tape containing 2% by weight of the coated pigment described in Example 34 having 52% overlap.

EXAMPLE 36

Kronos 2078 was coated with Gelest SST-3P01 polyphenylsilsequioxane (PPSQ) in a ratio of 4:1 TiO$_2$:XLPPSQ as described in Example 15, and 1.25% by weight of the coated pigment was mixed with PTFE to prepare an unsintered 0.076 mm (0.003 inch) thick PTFE tape. A conductor was prepared by wrapping mica tape on the wire with 50% overlap. The mica tape was covered by first and second layers of the unsintered 0.076 mm (0.003 inch) thick PTFE tape, each overlapped 52%.

EXAMPLE 37

Mica tape was wrapped on the wire with 50% overlap. It was covered with one layer of the 0.076 mm (0.003 inch) PTFE tape containing 2% by weight of the coated pigment described in Example 34, and overlapped 52%. The contrast was lower with a single layer of PTFE tape than with two layers, as compared with Example 35.

EXAMPLE 38

Mica tape was wrapped on the wire with 50% overlap. It was covered with one layer of the 0.076 mm (0.003 inch) PTFE tape containing 2% by weight of the coated pigment described in Example 34, and overlapped 69%. Increased wall thickness (resulting from the increased overlap) produced higher contrast, as shown by comparing Examples 37 and 38.

Heat Aging of Marked Samples

Heat aging was conducted on laser-marked samples at the temperatures and for the times indicated in Table VI. Examples 31 and 32 are comparative examples. Even after heat-aging, compositions of the invention showed high contrast.

TABLE VI

| Example | Initial Contrast (%) | Aging T (° C.) | Aging time (hours) | Aged Contrast (%) |
|---|---|---|---|---|
| 11 | 83 | 310 | 24 | 82 |
| 12 | 75 | 310 | 24 | 72 |
| 13 | 76 | 310 | 24 | 68 |
| 19 | 88 | 310 | 3 | 90 |
|  |  | 310 | 6 | 89 |
|  |  | 310 | 12 | 86 |
|  |  | 310 | 24 | 83 |
| 31 | 70 | 290 | 168 | 65 |
|  |  | 290 | 336 | 65 |
|  |  | 260 | 677 | 65 |
| 32 | 60 | 290 | 168 | 40 |
|  |  | 290 | 678 | 37 |
|  |  | 260 | 678 | 37 |
| 35 | 86 | 310 | 24 | 73 |
| 37 | 77 | 310 | 24 | 69 |
| 38 | 81 | 310 | 24 | 75 |

What is claimed is:

1. A composition suitable for laser marking when exposed to radiation from an excimer laser, said composition comprising
   (1) a fluoropolymer having a processing temperature T$_p$,
   (2) 0.1 to 50% by weight of the composition of a colorless UV-absorbing pigment, and
   (3) a synergist having the formula

wherein
   (a) m is 1 to 3, n is 1 to 3, p is at least 1, and q is 0 to 3, and
   (b) at least one R or R' is a substituent that upon pyrolysis generates a black material suitable for providing a mark,
   said synergist being (i) present at at least 10% by weight of the pigment present in the polymer composition, (ii) heat stable at a temperature of at least T$_p$, and (iii) in physical proximity with the pigment.

2. A composition according to claim 1 wherein the fluoropolymer is a melt-processible fluoropolymer.

3. A composition according to claim 2 wherein the fluoropolymer comprises PFA, MFA, ETFE, or FEP.

4. A composition according to claim 1 wherein the fluoropolymer comprises PTFE.

5. A composition according to claim 1 wherein the synergist comprises a silsesquioxane or a polyhedral oligomeric (POSS).

6. A composition according to claim 5 wherein the synergist comprises dodecaphenylsilsesquioxane.

7. A composition according to claim 1 wherein the synergist is present at at least 20% by weight of the pigment.

8. A composition according to claim 1 wherein the pigment comprises TiO$_2$, ZnO, or ZnS.

9. A composition suitable for laser marking when exposed to radiation from an excimer laser, said composition comprising
   (1) polytetrafluoroethylene,
   (2) 0.1 to 50% by weight of the composition of a colorless UV-absorbing pigment, and
   (3) a synergist having the formula

wherein (a) m is 1 to 3, n is 1 to 3, p is at least 1, and q is 0 to 3, and (b) at least one R or R' is a substituent that upon pyrolysis generates a black material suitable for providing a mark, said synergist being (i) present at at least 0.1% by weight of the pigment present in the polymer composition, (ii) heat stable at a temperature of at least $T_p$, and (iii) in physical proximity with the pigment.

10. An insulated conductor which comprises (A) an elongate wire, and (B) an insulating layer surrounding said wire, said layer comprising a composition which comprises (1) a fluoropolymer having a processing temperature $T_p$, (2) 0.1 to 25% by weight of the composition of a colorless UV-absorbing pigment, and (3) a synergist having the formula $[R_m(SiO_n)]_p R'_q$, wherein (a) m is 1 to 3, n is 1 to 3, p is at least 1, and q is 0 to 3, and (b) at least one R or R' is a substituent that upon pyrolysis generates a black material suitable for providing a mark, said synergist being (i) present at at least 10% by weight of the pigment present in the polymer composition, (ii) heat stable at a temperature of at least $T_p$, and (iii) in physical proximity with the pigment.

11. A conductor according to claim 10 wherein the composition comprises a perfluoropolymer.

12. A conductor according to claim 11 wherein the perfluoropolymer is PTFE.

13. A conductor according to claim 12 wherein the synergist comprises dodecaphenylsilsesquioxane.

14. A conductor according to claim 10 which, when exposed to an excimer laser at a wavelength of 308 nm and a fluence of 800 mJ/cm², produces a mark having a contrast of at least 70%.

* * * * *